(12) United States Patent
Christensen et al.

(10) Patent No.: US 10,910,910 B2
(45) Date of Patent: Feb. 2, 2021

(54) ACOUSTICAL TREATMENT FOR A ROTOR OF A LAUNDRY APPLIANCE

(71) Applicant: WHIRLPOOL CORPORATION, Benton Harbor, MI (US)

(72) Inventors: Mark J. Christensen, Stevensville, MI (US); Mihir Kikale, Pune (IN); Eduardo Abraham Lopez Benitez, St. Joseph, MI (US); Sushil Sakharam Paradhe, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 164 days.

(21) Appl. No.: 16/104,555

(22) Filed: Aug. 17, 2018

(65) Prior Publication Data

US 2020/0059130 A1    Feb. 20, 2020

(51) Int. Cl.
| | |
|---|---|
| *D06F 37/20* | (2006.01) |
| *H02K 5/24* | (2006.01) |
| *D06F 37/30* | (2020.01) |
| *H02K 7/10* | (2006.01) |
| *H02K 7/14* | (2006.01) |
| *H02K 21/22* | (2006.01) |

(52) U.S. Cl.
CPC ............ *H02K 5/24* (2013.01); *D06F 37/206* (2013.01); *D06F 37/30* (2013.01); *H02K 7/1004* (2013.01); *H02K 7/14* (2013.01); *H02K 21/22* (2013.01)

(58) Field of Classification Search
CPC ....................................................... H02K 5/24
See application file for complete search history.

(56) References Cited

U.S. PATENT DOCUMENTS

| | | |
|---|---|---|
| 3,500,083 A | 3/1970 | Dochterman |
| 3,546,504 A | 12/1970 | Janssen et al. |
| 4,661,731 A | 4/1987 | Wenz |
| 5,886,435 A | 3/1999 | Dymond |
| 2011/0291514 A1 | 12/2011 | Figgins et al. |
| 2017/0126080 A1 | 5/2017 | Hasegawa |
| 2017/0250583 A1 | 8/2017 | Peng et al. |

FOREIGN PATENT DOCUMENTS

| | | |
|---|---|---|
| EP | 0748027 | 12/1996 |
| EP | 3299506 | 3/2018 |
| IT | UB20161009 | 8/2017 |

*Primary Examiner* — Jason Y Ko
(74) *Attorney, Agent, or Firm* — Price Heneveld LLP

(57) ABSTRACT

A drive motor for a laundry appliance includes a stator having a plurality of windings that extend around teeth of the stator. A rotor is in electromagnetic communication with the stator. The rotor is coupled to a drive shaft that extends through the stator. When the winding of the stator is electrically energized, the rotor rotates relative to the stator at a predetermined range of rotational frequencies that includes a baseline natural frequency of the rotor. A harmonic-modulating member is attached to the rotor that modulates the baseline natural frequency of the rotor to be a modulated natural frequency. The predetermined range of rotational frequencies is free of the modulated natural frequency of the rotor.

20 Claims, 8 Drawing Sheets

US 10,910,910 B2

ACOUSTICAL TREATMENT FOR A ROTOR OF A LAUNDRY APPLIANCE

FIELD OF THE DEVICE

The device is in the field of laundry appliances, and more specifically, an acoustical treatment that can be attached to a rotor of an electric motor used in a laundry appliance.

SUMMARY

In at least one aspect, a drive motor for a laundry appliance includes a stator having a plurality of windings that extend around teeth of the stator. A rotor is in electromagnetic communication with the stator. The rotor is coupled to a drive shaft that extends through the stator. When the winding of the stator is electrically energized, the rotor rotates relative to the stator at a predetermined range of rotational frequencies that includes a baseline natural frequency of the rotor. A harmonic-modulating member is attached to the rotor that modulates the baseline excitation frequency of the rotor to be a modulated natural frequency. The predetermined range of rotational frequencies is free of the modulated natural frequency of the rotor.

In at least another aspect, an electric motor for a laundry appliance includes a stator having a plurality of windings that extend around teeth of the stator. A rotor is positioned around the stator. An electrical current is delivered to the plurality of windings and produces an electromotive force that rotationally operates the rotor about the stator at a predetermined range of rotational frequencies that includes a noise-producing natural frequency of the rotor. A harmonic-modulating metallic plate is attached to the rotor and that modulates the noise-producing natural frequency of the rotor to be a modulated natural frequency. The predetermined range of rotational frequencies is free of the modulated natural frequency of the rotor.

In at least another aspect, an electric motor for a laundry appliance includes a stator having a plurality of windings that extend around teeth of the stator. A rotor is positioned around the stator. An electrical current is selectively delivered to the plurality of windings and produces an electromotive force that rotationally operates the rotor about the stator at a predetermined range of rotational frequencies that includes a noise-producing natural frequency of the rotor. At least one harmonic-modulating concentric member is attached to the rotor and that modulates the noise-producing natural frequency of the rotor to be a modulated natural frequency. The predetermined range of rotational frequencies is free of the modulated natural frequency of the rotor.

These and other features, advantages, and objects of the present device will be further understood and appreciated by those skilled in the art upon studying the following specification, claims, and appended drawings.

DETAILED DESCRIPTION OF EMBODIMENTS

Figure 1:
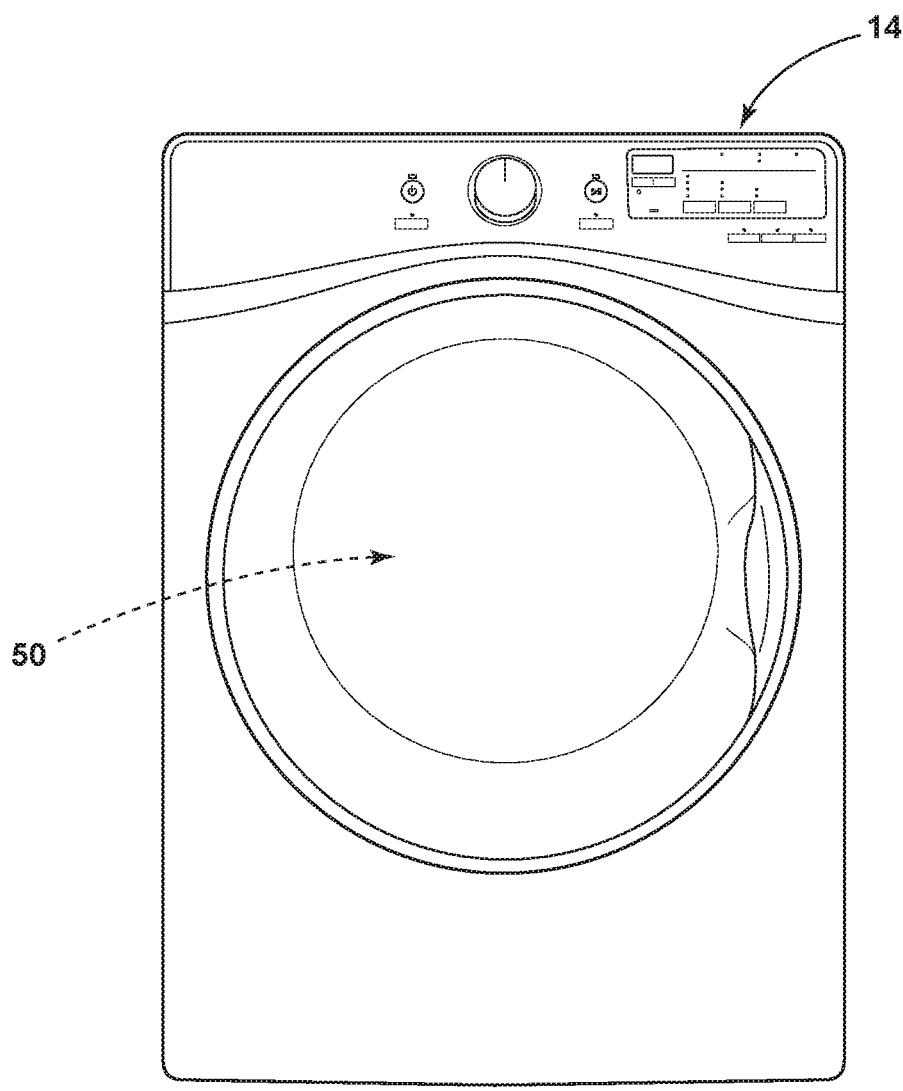
FIG. 1 is a front elevational view of a laundry appliance incorporating an electric motor that utilizes an aspect of the acoustical rotor treatment.
Figure 2:
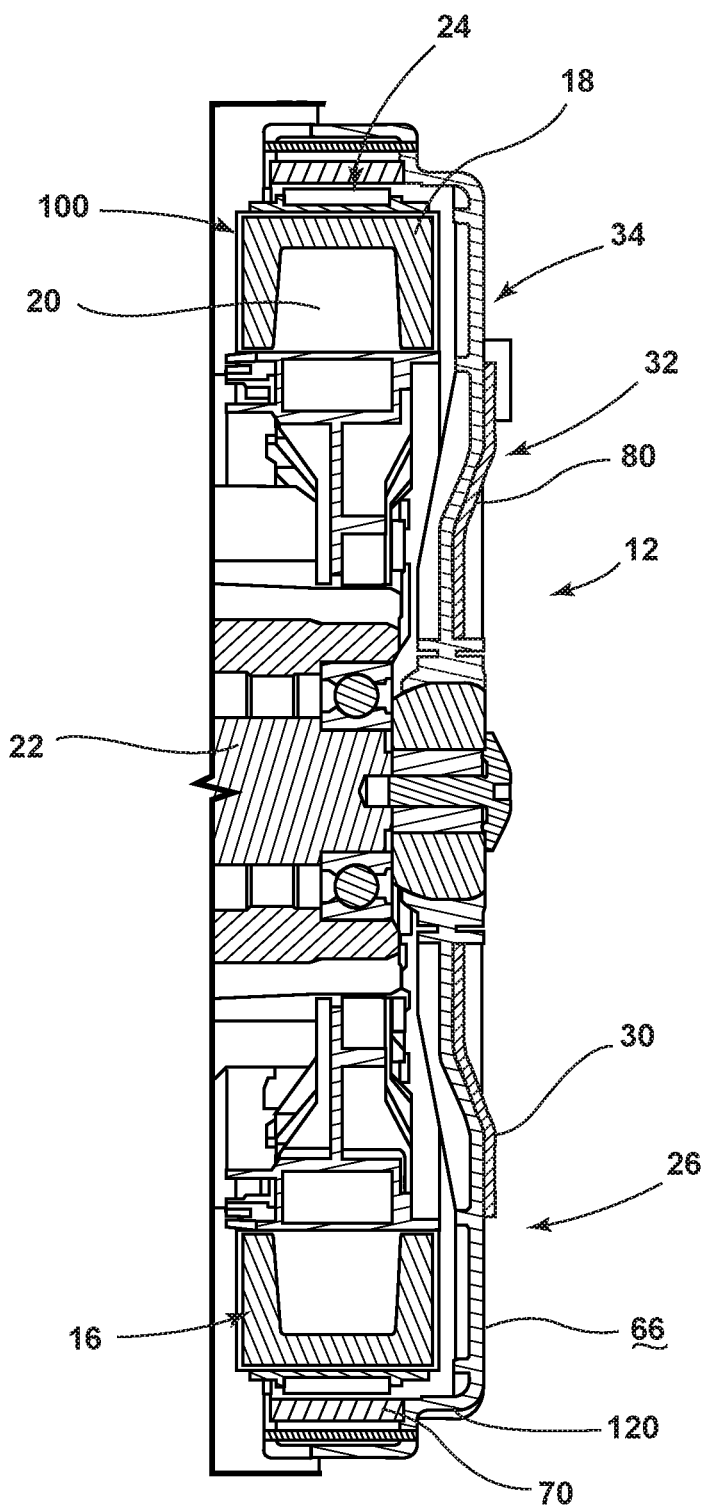
FIG. 2 is a cross-sectional view of an electric motor for a laundry appliance that utilizes an aspect of the acoustical rotor treatment.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With respect to FIGS. 1-8, reference numeral 10 generally refers to a rotor that is incorporated within an electric motor 12 of a laundry appliance 14. The electric motor 12 for the laundry appliance 14 can be in the form of a direct drive motor or a belt-driven motor that includes a stator 16 with a plurality of windings 18 that extend around teeth 20 of the stator 16. The rotor 10 of the electric motor 12 is in electromagnetic communication with the stator 16. The rotor 10 is coupled to a drive shaft 22 that extends through the stator 16. When the winding 18 of the stator 16 is electrically energized, an electromotive force 24 is generated between the rotor 10 and the stator 16. The electromotive force 24 rotates the rotor 10 relative to the stator 16 at a predetermined range of rotational frequencies 26 that includes a noise-producing baseline natural frequency 28 of the rotor 10. A harmonic-modulating member, in the form of the acoustical rotor treatment 30, is attached to the rotor 10. The acoustical rotor treatment 30 is configured to modulate the baseline natural frequency 28 of the rotor 10 to be in the form of a modulated natural frequency 32. Through the use of the acoustical rotor treatment 30, the predetermined range of rotational frequencies 26 is free of, falls outside of, or generally does not include the modulated natural frequency 32 of the composite rotor 34 having the acoustical rotor treatment 30.

According to various aspects of the device, the baseline natural frequency 28 of the rotor 10 represents an acoustic resonating natural frequency 40 that results in natural internal vibration and/or excessive noise that emanates from the structure of the rotor 10 during operation of the electric motor 12. The baseline natural frequency 28 for a particular rotor 10 can depend upon various factors that can include, but are not limited to, the material of the rotor 10, the size of the rotor 10, the dimensional characteristics of the rotor 10, the configuration of the stator 16 with respect to the rotor 10, whether the rotor 10 is an inner rotor or outer rotor configuration, combinations thereof, and other similar factors that can vary depending upon the design of the electric motor 12 for the laundry appliance 14. The addition of the acoustical rotor treatment 30 results in a composite rotor 34. This composite rotor 34 includes an acoustic resonating natural frequency 40 in the form of the modulated natural frequency 32. The modulated natural frequency 32 is different, and typically higher, than the baseline natural frequency 28.

The electric motor 12 for the laundry appliance 14 can be in the form of a direct drive motor, where the drive shaft 22 that is attached to the rotor 10 extends through the stator 16 and attaches directly to a rotating drum 50 for the laundry appliance 14. The rotating drum 50 can be used for washing and/or drying laundry within the laundry appliance 14. The electric motor 12 can also be in the form of a belt-drive motor, where the drive shaft 22 of the rotor 10 is coupled to a belt drive for rotationally operating a laundry-treating drum 50 for the laundry appliance 14. Where the electric motor 12 is a belt-drive motor, the drive shaft 22 coupled to the rotor 10 can also be used with a drive wheel for operating additional components of the laundry appliance 14, such as a mechanical fluid pump, and other mechanical components of the laundry appliance 14.

Figure 3:
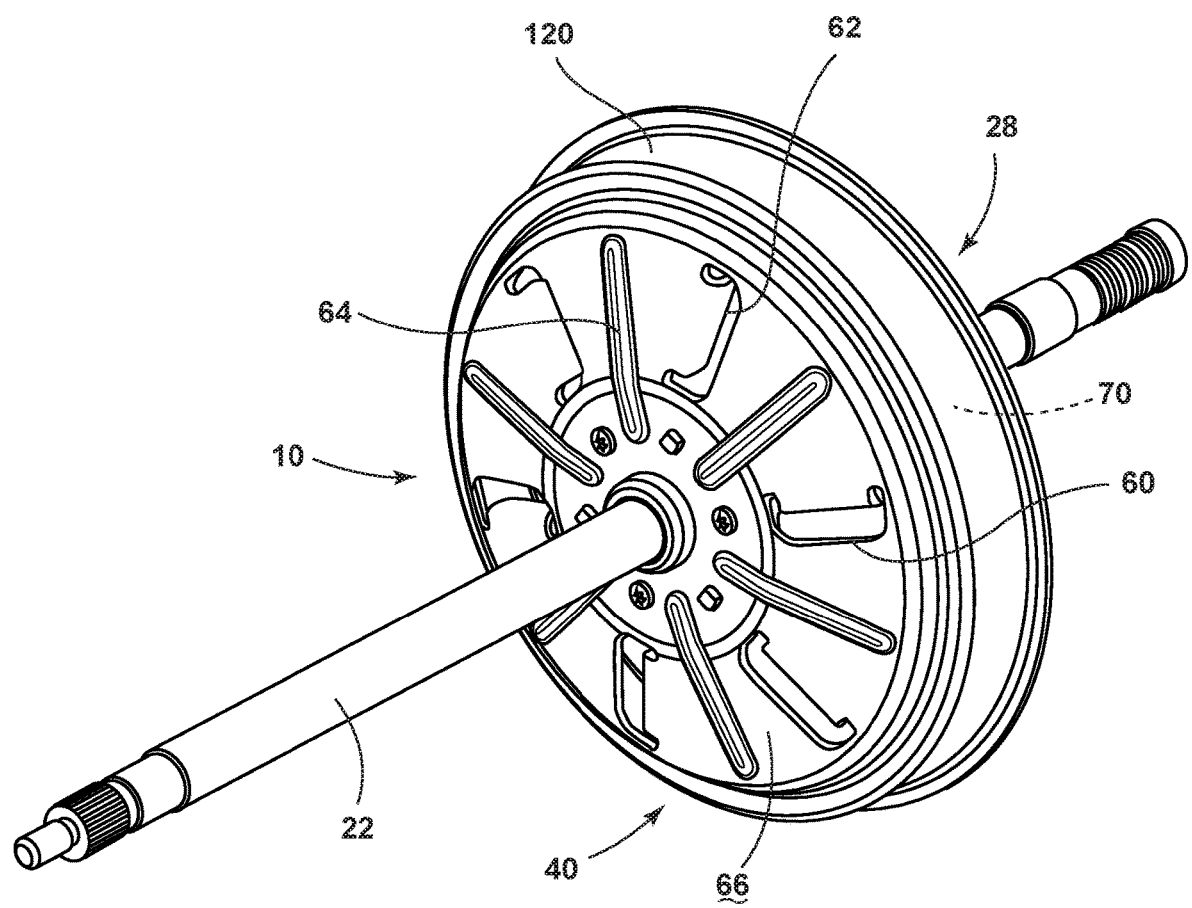
FIG. 3 is an aspect of the rotor for an electric motor of the laundry appliance.
Figure 4:
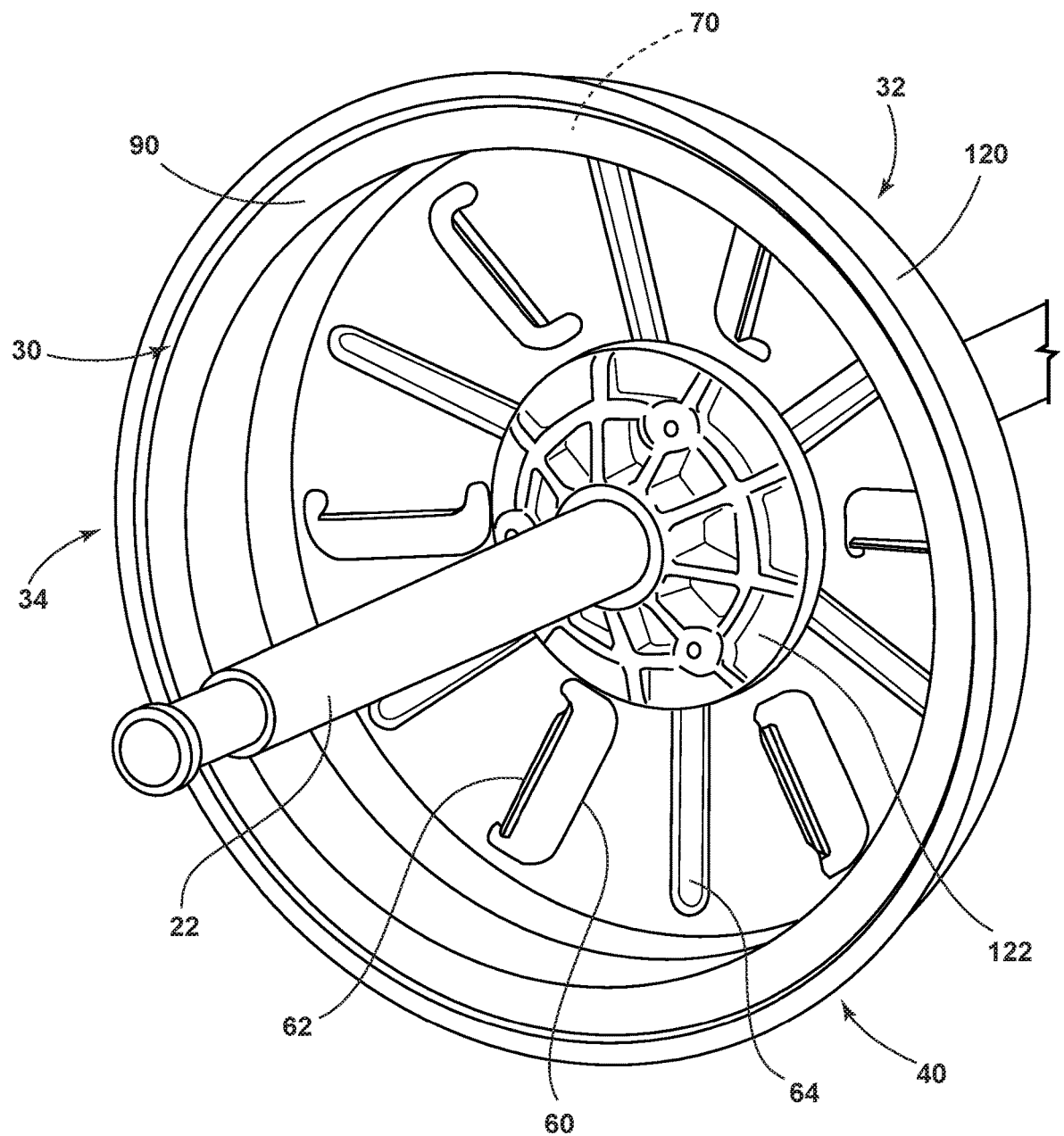
FIG. 4 is a perspective view of a rotor for an electric motor of a laundry appliance utilizing an aspect of the acoustical rotor treatment.

As exemplified in FIG. 3, the rotor 10 for the electric motor 12 can include a plurality of air-directing slits 60 that are defined within the rotor 10. These air-directing slits 60 can also incorporate respective fins 62 that direct air within and through the electric motor 12 for cooling the electric motor 12 during operation of the rotor 10. The air-directing slits 60 and respective fins 62 are typically spaced at regular radial intervals about the rotor 10 to maintain rotational balance of the rotor 10 during operation. The rotor 10 can also include various reinforcing ribs 64 that are defined within the outer surface 66 of the rotor 10. These reinforcing ribs 64 serve to reinforce the rotor 10 to counteract unwanted bending and deflection during operation of the rotor 10.

Typically, the rotor 10 is configured to operate at relatively high rotational rates that can include, as an exemplary range, approximately 8 revolutions per second to approximately 85 revolutions per second. It should be understood that the predetermined range of rotational frequencies 26 of the rotor 10 can be less than 8 revolutions per second and can also be greater than 85 revolutions per second. The operational ranges for the rotor 10 can vary depending upon the design of the electric motor 12, the function of the electric motor 12, and the overall design for the laundry appliance 14. Within this range of operational speeds for the rotor 10, the baseline natural frequency 28 is typically within this predetermined range of rotational frequencies 26. As an example, the baseline natural frequency 28 of the rotor 10 for a belt-drive electric motor 12 can be approximately 45 revolutions per second. This exemplary range for the baseline natural frequency 28 has been shown to occur within a belt-drive electric motor 12 having 24 magnets 70 disposed within an outer wall of the rotor 10. The use of these 24 magnets 70 can typically correspond to a motor-dominant harmonic that is of the $24^{th}$ order where the baseline natural frequency 28 is substantially equivalent to 45 revolutions per second, or 45 Hz times the $24^{th}$ order of the motor, which is equivalent to approximately 1080 Hz.

Figure 5:
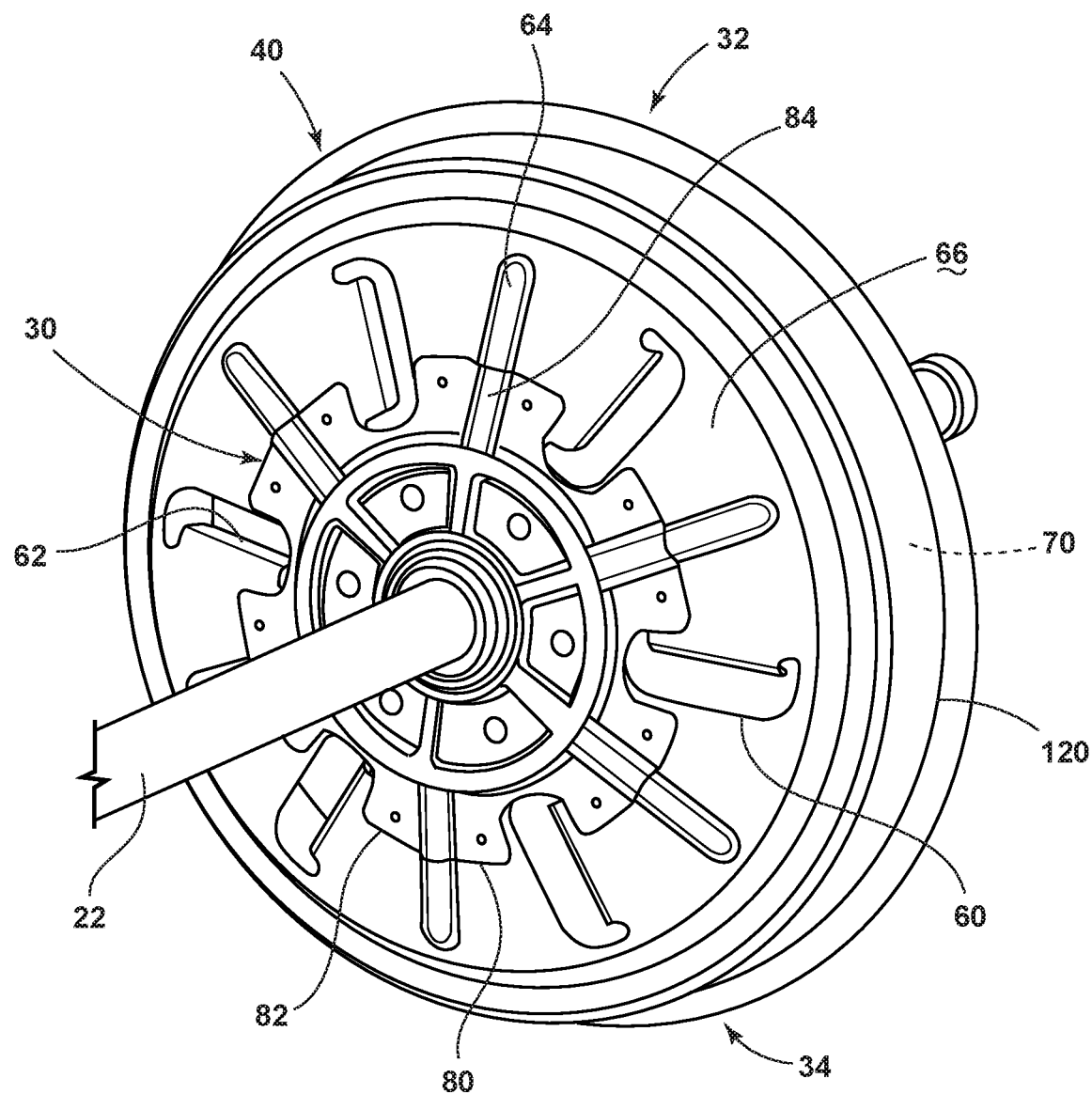
FIG. 5 is a perspective view of a rotor for an electric motor of a laundry appliance utilizing an aspect of the acoustical rotor treatment.
Figure 6:
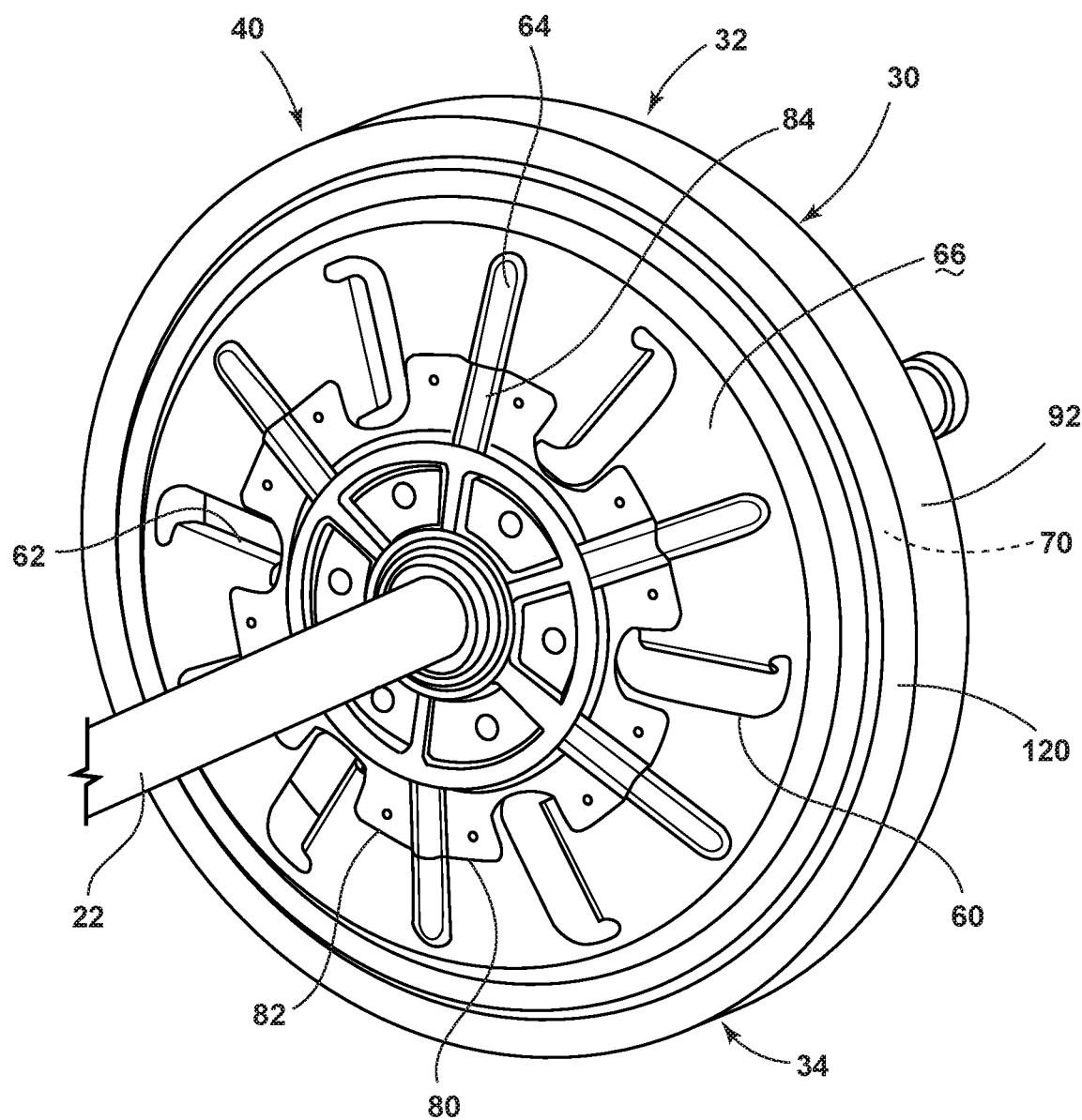
FIG. 6 is a perspective view of a rotor for an electric motor of a laundry appliance utilizing an aspect of the acoustical rotor treatment.
Figure 7:
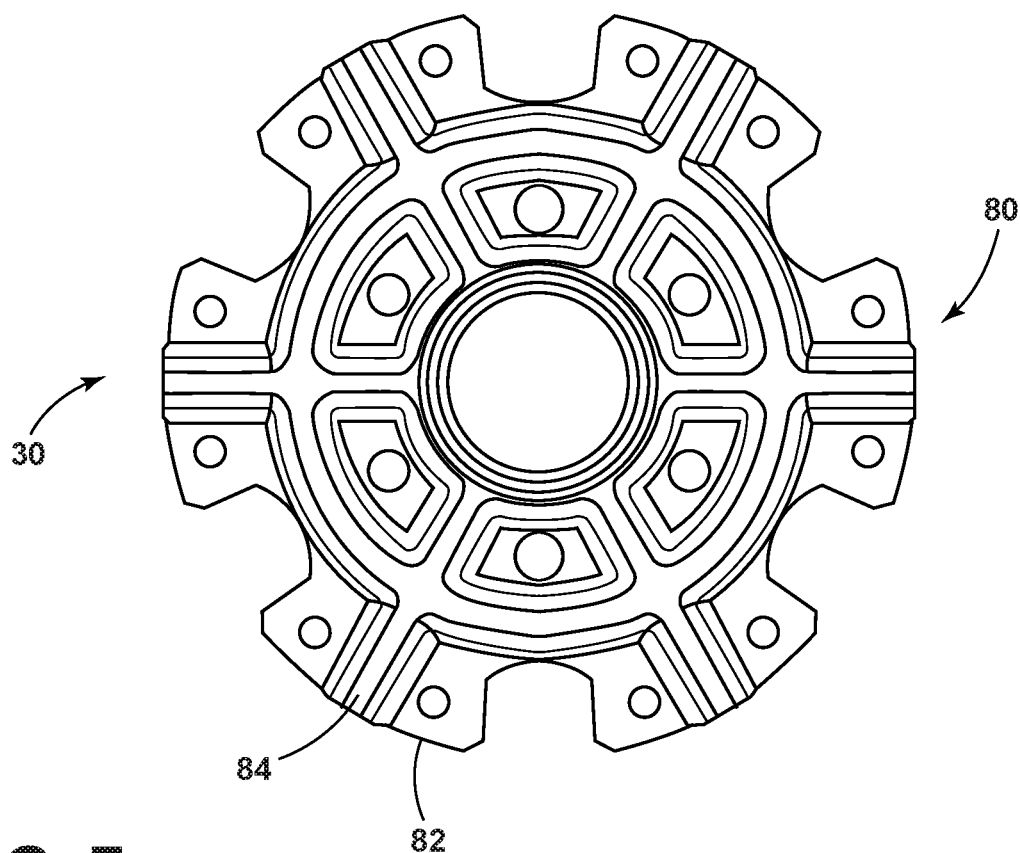
FIG. 7 is an elevational view of an acoustical reinforcing plate that represents an aspect of the acoustical rotor treatment for various aspects of the device.
Figure 8:
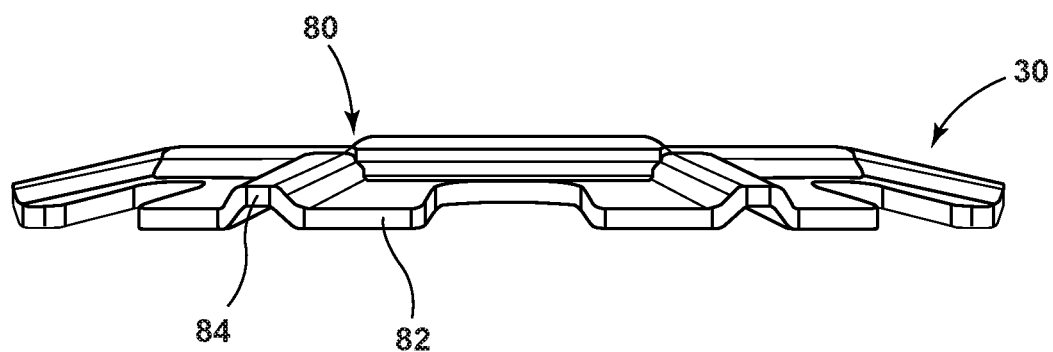
FIG. 8 is a side elevational view of the reinforcing plate of FIG. 7.

According to various aspects of the device, as exemplified in FIGS. 5 and 6, various exemplary aspects of the acoustical rotor treatment 30 can include a reinforcing plate 80 that is attached to the outer surface 66 of the rotor 10. In such an embodiment, the harmonic modulating member can be in the form of a metallic reinforcing plate 80 that is positioned on an outer surface 66 of the rotor 10 and is concentric with the drive shaft 22. Additionally, the reinforcing plate 80 that is attached to the outer surface 66 of the rotor 10 can be contoured to include various protrusions 82 or outer extensions that extend at least partially around the air-directing slits 60 defined within the rotor 10 to prevent interference with a cooling airflow. Additionally, the surface of the reinforcing plate 80 can include undulations 84 that substantially confirm to the contour of the reinforcing ribs 64 of the rotor 10. In this manner, when the reinforcing plate 80 is attached to the outer surface 66 of the rotor 10, the undulations 84 and protrusions 82 of the reinforcing plate 80 substantially match the contours of the rotor 10. This matching surface configuration of the outer surface 66 of the rotor 10 and the reinforcing plate 80 ensures better surface-to-surface contact between the reinforcing plate 80 and the rotor 10. This surface-to-surface contact helps to ensure that the rotor 10 functions as a unitary piece that substantially defines a single modulated natural frequency 32.

According to various aspects of the device, the reinforcing plate 80 can be a steel member that is attached to the outer surface 66 of the rotor 10. Attachment of the reinforcing plate 80 can be accomplished through mechanical fasteners, adhesives, welding, combinations thereof, and other similar attachment methods and mechanisms.

In various aspects of the device, the reinforcing plate 80 is a metal member that is approximately 1.5 millimeters thick. The surface undulations 84 of the reinforcing member can be shaped, stamped, or otherwise formed within the reinforcing plate 80. Through this configuration, the thickness of the reinforcing plate 80 can be substantially consistent throughout the acoustical rotor treatment 30.

As exemplified in FIGS. 3-6, additional aspects of the acoustical rotor treatment 30 can be in the form of inner or outer inertial rings 90, 92 that can be attached proximate the magnets 70 of the rotor 10. Where the inner and/or outer inertial rings 90, 92 are used, the inner and outer inertial rings 90, 92 are typically metallic members that can be made of aluminum, steel, metallic alloys, combinations thereof, and other similar materials. Typically, the inner and outer inertial rings 90, 92 are made of aluminum, so as not to substantially interfere with the magnetic operation of the rotor 10 or interfere with the electromagnetic communication between the magnets 70 of the rotor 10 and the energized windings 18 of the stator 16.

Referring again to FIGS. 1, 2 and 5-8, the electric motor 12 for the laundry appliance 14 includes the stator 16 that includes a plurality of windings 18 that extend around the teeth 20 of the stator 16. The rotor 10 is positioned around the stator 16 such that when an electrical current 100 is delivered to the plurality of windings 18, the energized windings 18 produce an electromotive force 24 that rotationally operates the rotor 10 about the stator 16 at a predetermined range of rotational frequencies 26. As discussed above, this predetermined range of rotational frequencies 26 typically includes the noise-producing baseline natural frequency 28 of the rotor 10. The harmonic-modulating reinforcing plate 80 is attached to the rotor 10 and serves to modulate the baseline natural frequency 28 of the rotor 10 to be a modulated natural frequency 32. Again, the predetermined range of rotational frequencies 26 is free of or outside of the modulated natural frequency 32 of the rotor 10. When the metallic reinforcing plate 80 is attached to the rotor, the harmonic characteristics of the rotor are modulated so that the predetermined range of rotational frequencies 26 operates below the modulated natural frequency 32 or, in some embodiments, operates above the modulated natural frequency 32 of the rotor 10. Through the use of the harmonic-modulating reinforcing plate 80, the various harmonic properties and characteristics of the rotor 10 are modulated so that the various operating modes of the rotor 10 do not fall within the modulated natural frequency 32 of the rotor 10. During operation of the rotor 10 at higher rotational frequencies, the rotor 10 may achieve the modulated natural frequency 32 on a very limited basis as the rotor 10 speeds up to achieve a rotational speed that may exceed or be faster than the modulated natural frequency 32. Through the use of the harmonic-modulating reinforcing plate 80, when the stator 16 is energized, the rotor 10 operates in a range of modes that correspond to operational frequencies that are typically below the modulated natural frequency 32.

In certain aspects of the device, the electrical current 100 delivered to the stator 16 for energizing the windings 18 can also be modified in conjunction with the addition of the acoustical rotor treatment 30. Accordingly, avoidance of the baseline natural frequency 28 can be achieved through the addition of the acoustical rotor treatment 30. Avoidance of the baseline natural frequency 28 can also be achieved through the addition of the acoustical rotor treatment 30 in conjunction with a modification of the electrical current 100 delivered to the stator 16 for energizing the windings 18 of the stator 16. Where the rotor 10 is modified by only adding the acoustical rotor treatment 30, the addition of the acoustical rotor treatment 30 can be accomplished in newly manufactured appliances and can also be applied to aftermarket appliances through the addition of the acoustical rotor treatment 30 to the pre-manufactured rotor 10 of the electric motor 12 of the laundry appliance 14.

Figure 9:
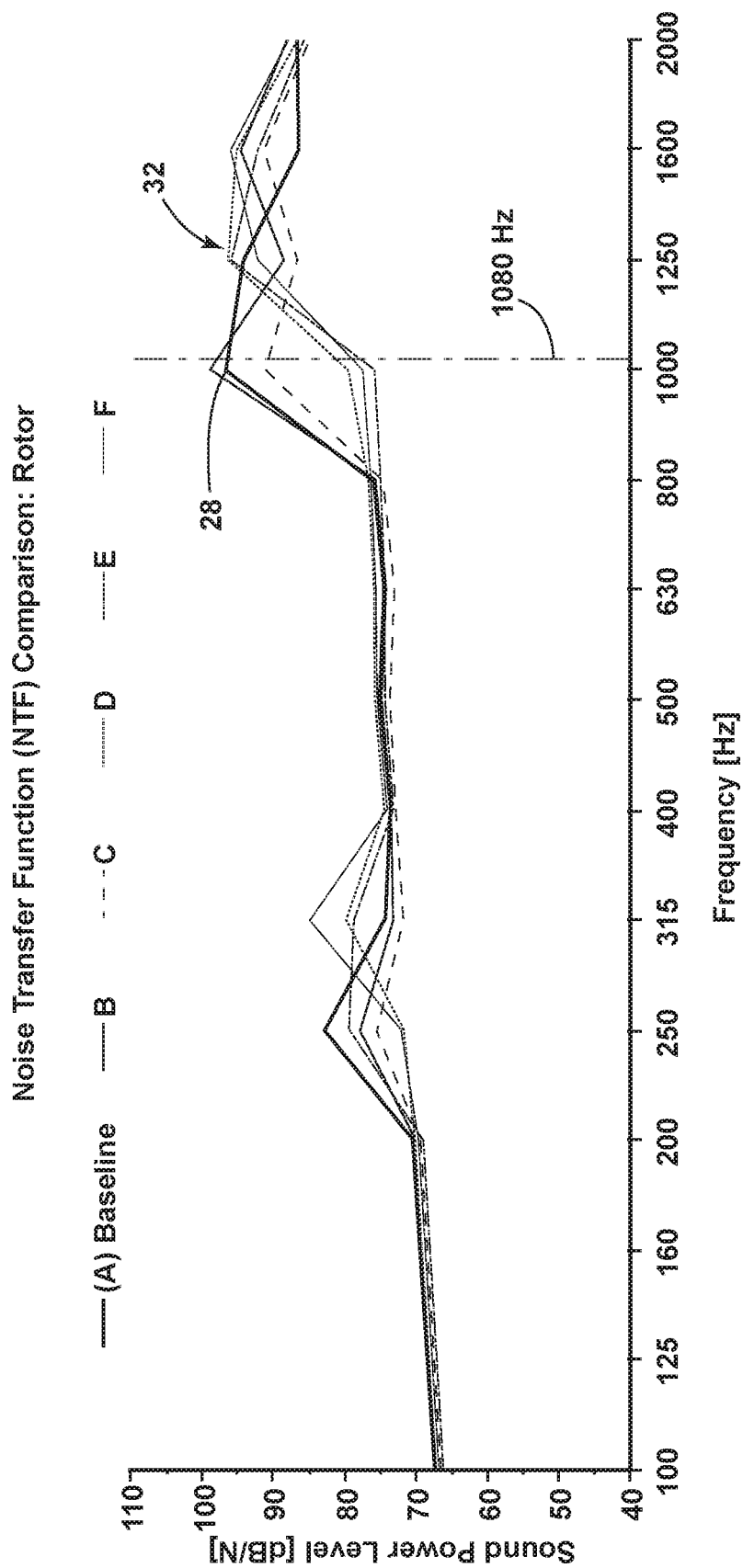
FIG. 9 is a schematic diagram illustrating noise-performance results for various aspects of the acoustical rotor treatment.

As discussed above, in various aspects of the device, the addition of the acoustical rotor treatment 30 can result in a modification of the noise-producing baseline natural frequency 28. In such an embodiment, the noise-producing baseline natural frequency 28 of the composite rotor 34 having the acoustical rotor treatment 30 can be modulated to the modulated natural frequency 32 that falls outside of the predetermined range of rotational frequencies 26. This modulated natural frequency 32 is exemplified in the schematic data plot illustrated in FIG. 9.

Referring again to FIGS. 1-8, the electric motor 12 for the laundry appliance 14 can include the stator 16 that includes a plurality of windings 18 that extend around the teeth 20 of the stator 16. The rotor 10 is positioned around the stator 16. When an electrical current 100 is selectively delivered to the plurality of windings 18, the electrical current 100 produces an electromotive force 24 that rotationally operates the rotor 10 about the stator 16 at a predetermined range of rotational frequencies 26 that includes the noise-producing baseline natural frequency 28 of the rotor 10. The acoustical rotor treatment 30, in the form of at least one harmonic-modulating concentric member, typically in the form of the reinforcing plate 80, is attached to the rotor 10. As discussed above, the acoustical rotor treatment 30 serves to modulate at least one of the predetermined range of rotational frequencies 26 or the noise-producing natural frequency of the rotor 10.

The modulation of the predetermined range of rotational frequencies 26 results in the predetermined range of rotational frequencies 26 to be in the form of a modulated range of rotational frequencies. The modulated range of rotational frequencies is configured to be above and/or below the modulated natural frequency 32 of the rotor 10. Typically, the various operational modes of the electric motor 12 that correspond to operating modes of the laundry appliance 14 do not include the modulated natural frequency 32 of the rotor 10.

As discussed above, the acoustical rotor treatment 30 that includes the at least one harmonic-modulating concentric member includes a harmonic-modulating metal reinforcing plate 80 that is approximately 1.5 mm thick. This configuration of the acoustical rotor treatment 30 is exemplary in nature and can be modified based upon the exact design of the laundry appliance 14. As discussed above, the predetermined range of rotational frequencies 26 of the rotor 10 is typically from approximately 8 revolutions per second to approximately 85 revolutions per second. Additionally, the noise-producing baseline natural frequency 28 of the rotor 10 is approximately 45 revolutions per second and the modulated natural frequency 32 is typically above the predetermined range of rotational frequencies 26, such as approximately 90 revolutions per second, for example. Accordingly, the predetermined range of rotational frequencies 26 typically falls above or below the modulated natural frequency 32 of the rotor 10 so that the excessive noise experienced during this operational frequency can be substantially avoided during operation of the laundry appliance 14. Additionally, where the rotor 10 includes a plurality of air-directing slits 60 and corresponding air fins 62, the harmonic-modulating reinforcing plate 80 includes outer protrusions 82 or flanges that extend at least partially around the air-directing slits 60 to prevent interference with the movement of air within and around the stator 16 for the electric motor 12.

Referring now to FIGS. 1-9, the various modes of vibration of the rotor 10 of the electric motor 12 for the laundry appliance 14 can include one or more rotor-pumping modes and various rotor-ring modes. These exemplary modes of vibration are typically closer to 45 Hz times the $24^{th}$ order of the motor, when operated in the absence of the acoustical rotor treatment 30. The absence of the acoustical rotor treatment 30 is shown within FIG. 9 at data line A of the schematic of FIG. 9. Data lines B-F correspond to various configurations of the acoustical rotor treatment 30 for modulating the baseline natural frequency 28 of the rotor 10. Data points D-F show a significant decrease in noise at the relevant noise-producing excitation frequency of approximately 1,080 Hz (approximately 45 revolutions per second times the $24^{th}$ order of the motor). This result is achieved through the use of the reinforcing plate 80 exemplified in FIGS. 7 and 8 and shown within the rotor 10 at FIGS. 5 and 6. The use of the inner or outer inertial ring 90, 92 is also exemplified in data points E and F. As discussed above, the exact modulation of the various noise-producing baseline natural frequency 28 for a particular electric motor 12 can vary depending upon the design of the particular electric motor 12 used within the laundry appliance 14.

Referring again to FIGS. 3-9, the use of the acoustical rotor treatment 30 can serve to alter the baseline natural frequency 28 into the modulated natural frequency 32 in order to avoid the noise-producing baseline natural frequency 28 of the rotor 10. This can be accomplished by the use of the acoustical rotor treatment 30 for changing the harmonic characteristics of the rotor 10 to incorporate a different noise-producing modulated natural frequency 32 that falls outside of the predetermined range of rotational frequencies 26. In this manner, the addition of the acoustical rotor treatment 30 modifies the natural harmonic frequency 40 of the rotor 10 so that the rotor 10 can increase in speed, without substantial harmonic disturbance during the use of the laundry appliance 14. Accordingly, the noise-producing baseline natural frequency 28 is changed to fall outside of the predetermined range of rotational frequencies 26. The acoustical rotor treatment 30 can be included to change the natural harmonic frequency 40 of the composite rotor 34 into the modulated natural frequency 32. This result produces a modulated natural frequency 32 that does not produce significant harmonic noise or vibration during operation of the rotor 10 and minimizes the amount of noise produced by the electric motor 12 during operation of the laundry appliance 14.

Referring again to FIG. 9, data plot D illustrates the rotor 10 that incorporates the reinforcing plate 80 and does not include the inner or outer inertial rings 90, 92 positioned proximate the magnets 70 of the rotor 10. Data plots E and F each include the reinforcing plate 80 and also includes the outer inertial ring 92 (data plot E) or the inner inertial ring 90 (data plot F). Data plot B only exemplifies use of the inner inertial ring 90 and data plot C exemplifies use of only the outer inertial ring 92.

According to various aspects of the device, the rotor 10 can be made of various materials that can include magnets 70, steel, aluminum in the form of a backer ring that extends around the rotor cup 120 and the magnets 70, a steel drive shaft 22, and the metal reinforcing plate 80. The rotor mount 122 that is positioned within the rotor cup 120 can be in the form of glass filled material or other similar plastic-type material. As discussed above, the configuration of the rotor 10 can change depending upon the design of the electric motor 12. Changes in the material and dimensional characteristics of the rotor 10 can also result in a change in the natural harmonics of the composite rotor 34 and, in turn, the noise-producing modulated natural frequency 32 of the composite rotor 34. In each of these configurations, the acoustical rotor treatment 30 can be incorporated within the composite rotor 34 to produce the modulated natural frequency 32. Through the use of the acoustical rotor treatment 30, the modulated natural frequency 32 of a composite rotor 34 can be substantially avoided during operation of the laundry appliance 14 to minimize the amount of noise and vibration produced by the electric motor 12 during operation of the various laundry cycles.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A drive motor for a laundry appliance comprising:
   a stator having a plurality of windings that extend around teeth of the stator;
   a rotor in electromagnetic communication with the stator, the rotor coupled to a drive shaft that extends through the stator, wherein when the winding of the stator is electrically energized, the rotor rotates relative to the stator at a predetermined range of rotational frequencies that includes a baseline natural frequency of the rotor; and
   a harmonic-modulating member attached to the rotor that modulates the baseline natural frequency of the rotor to be a modulated natural frequency, wherein the predetermined range of rotational frequencies is free of the modulated natural frequency of the rotor, and wherein the harmonic-modulating member is a rigid member attached directly to the rotor.

2. The drive motor of claim 1, wherein the harmonic-modulating member is a metallic member that is positioned on an outer surface of the rotor and is concentric with the drive shaft.

3. The drive motor of claim 1, wherein the drive shaft of the rotor is coupled to a belt drive for rotationally operating a laundry-treating drum.

4. The drive motor of claim 1, wherein the drive shaft of the rotor is directly coupled to a laundry-treating drum.

5. The drive motor of claim 1, wherein the predetermined range of rotational frequencies of the rotor is from approximately 8 revolutions per second to approximately 85 revolutions per second.

6. The drive motor of claim 1, wherein the harmonic-modulating member is a reinforcing plate that is attached to an outer surface of the rotor.

7. The drive motor of claim 6, wherein the rotor includes a plurality of air-directing slits and wherein the reinforcing plate extends only partially around the air-directing slits.

8. The drive motor of claim 7, wherein the reinforcing plate is a metallic member that is approximately 1.5 millimeters thick.

9. The drive motor of claim 8, wherein the reinforcing plate is made of metal.

10. The drive motor of claim 5, wherein the baseline natural frequency of the rotor is approximately 45 revolutions per second and wherein the modulated natural frequency of the rotor is approximately 90 revolutions per second.

11. An electric motor for a laundry appliance comprising:
 a stator having a plurality of windings that extend around teeth of the stator;
 a rotor positioned around the stator, wherein an electrical current delivered to the plurality of windings produces an electromotive force that rotationally operates the rotor about the stator at a predetermined range of rotational frequencies that includes a noise-producing natural frequency of the rotor; and
 a harmonic-modulating metallic plate that is attached directly to the rotor and that modulates the noise-producing natural frequency of the rotor to be a modulated natural frequency, wherein the predetermined range of rotational frequencies is free of the modulated natural frequency of the rotor.

12. The electric motor of claim 11, wherein the harmonic-modulating metallic plate is a metal reinforcing plate that is approximately 1.5 millimeters thick.

13. The electric motor of claim 11, further comprising a drive shaft that extends from the rotor to a drive wheel for operating at least a mechanical fluid pump.

14. The electric motor of claim 11, wherein the predetermined range of rotational frequencies of the rotor is from approximately 8 revolutions per second to approximately 85 revolutions per second.

15. The electric motor of claim 11, wherein the rotor includes a plurality of air-directing slits and wherein the harmonic-modulating metallic plate extends at least partially around the air-directing slits.

16. The electric motor of claim 11, wherein the modulated natural frequency of the rotor exceeds the predetermined range of rotational frequencies.

17. An electric motor for a laundry appliance comprising:
 a stator having a plurality of windings that extend around teeth of the stator;
 a rotor positioned around the stator, wherein an electrical current selectively delivered to the plurality of windings produces an electromotive force that rotationally operates the rotor about the stator at a predetermined range of rotational frequencies that includes a noise-producing natural frequency of the rotor; and
 at least one harmonic-modulating concentric member that is attached directly to the rotor and that modulates the noise-producing natural frequency of the rotor to be a modulated noise-producing natural frequency, wherein the predetermined range of rotational frequencies is free of the modulated noise-producing natural frequency of the rotor, and wherein the at least one harmonic-modulating concentric member is a rigid metallic plate.

18. The electric motor of claim 17, wherein the at least one harmonic-modulating concentric member includes a harmonic-modulating metal reinforcing plate that is approximately 1.5 millimeters thick.

19. The electric motor of claim 17, wherein the predetermined range of rotational frequencies of the rotor is from approximately 8 revolutions per second to approximately 85 revolutions per second.

20. The electric motor of claim 17, wherein the rotor includes a plurality of air-directing slits and wherein the at least one harmonic-modulating concentric member extends partially around the air-directing slits.

\* \* \* \* \*